June 10, 1958     C. E. KRAUS     2,837,937
SPEED CHANGER

Filed Oct. 22, 1954     4 Sheets-Sheet 1

INVENTOR.
CHARLES E. KRAUS
BY *J. L. Bowes*
ATTORNEY

June 10, 1958

C. E. KRAUS
SPEED CHANGER 2,837,937

Filed Oct. 22, 1954

INVENTOR.
CHARLES E. KRAUS
BY
*J. L. Bowes*
ATTORNEY

June 10, 1958 C. E. KRAUS 2,837,937
SPEED CHANGER

Filed Oct. 22, 1954 4 Sheets-Sheet 3

INVENTOR.
CHARLES E. KRAUS
BY *T. L. Bowes*
ATTORNEY

June 10, 1958  C. E. KRAUS  2,837,937
SPEED CHANGER
Filed Oct. 22, 1954  4 Sheets-Sheet 4

INVENTOR.
CHARLES E. KRAUS
BY *J. L. Bower*
ATTORNEY

United States Patent Office 2,837,937
Patented June 10, 1958

2,837,937

SPEED CHANGER

Charles E. Kraus, Rochester, N. Y., assignor to Excelermatic, Inc., a corporation of New York Application October 22, 1954, Serial No. 463,880

9 Claims. (Cl. 74—804)

This invention relates to power transmission devices and more particularly to speed changers for such devices.

It is an object of my invention to provide a new and improved speed changer having relatively large speed reduction capabilities.

The foregoing object is accomplished in the preferred embodiment of my invention by utilizing a stationary ring and a single off-center or eccentric planet member supported by a planet carrier which is part of a driving element such as a driving or input shaft. The planet member constitutes a driven element and output power is taken off by an all-metal connection between the planet element and a driven or output shaft which compensates for the off-center position of the planet axis.

The planet member is arranged for rotation about an axis which is eccentric with respect to the axis of the driving element and is arranged to engage the fixed ring as it revolves whereby the point of contact between the planet member and the stationary ring makes one revolution for each revolution of the planet carrier. The planet member rotates backwards by the distance that the circumference of the ring exceeds the circumference of the planet.

By introducing an adjustment of the point of contact between ring and planet, the rate of rotation of the planet member may be changed and this rate approaches zero as the diameter of the ring at the point of engagement with the planet member approaches the diameter of the planet member at its point of contact with the ring.

For a complete understanding of the principles of my invention reference may be had to the following description and drawings in which Fig. 1 is a cross sectional view of a schematic representation of one embodiment of my invention;

Figure 3:
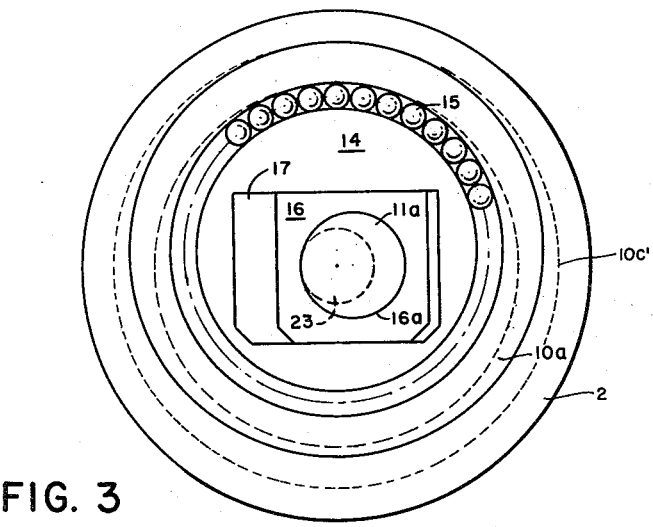
Fig. 3 is a sectional view along the line 3—3 of Fig. 2.

Referring to the drawings, there is shown a pair of rings 1 and 2 secured against rotation to the inside of case or housing 3 as by means of keyways 4 in the outer surfaces of the rings and pins 5 secured in or to casing 3 and extending into keyways 4.

Figure 2:
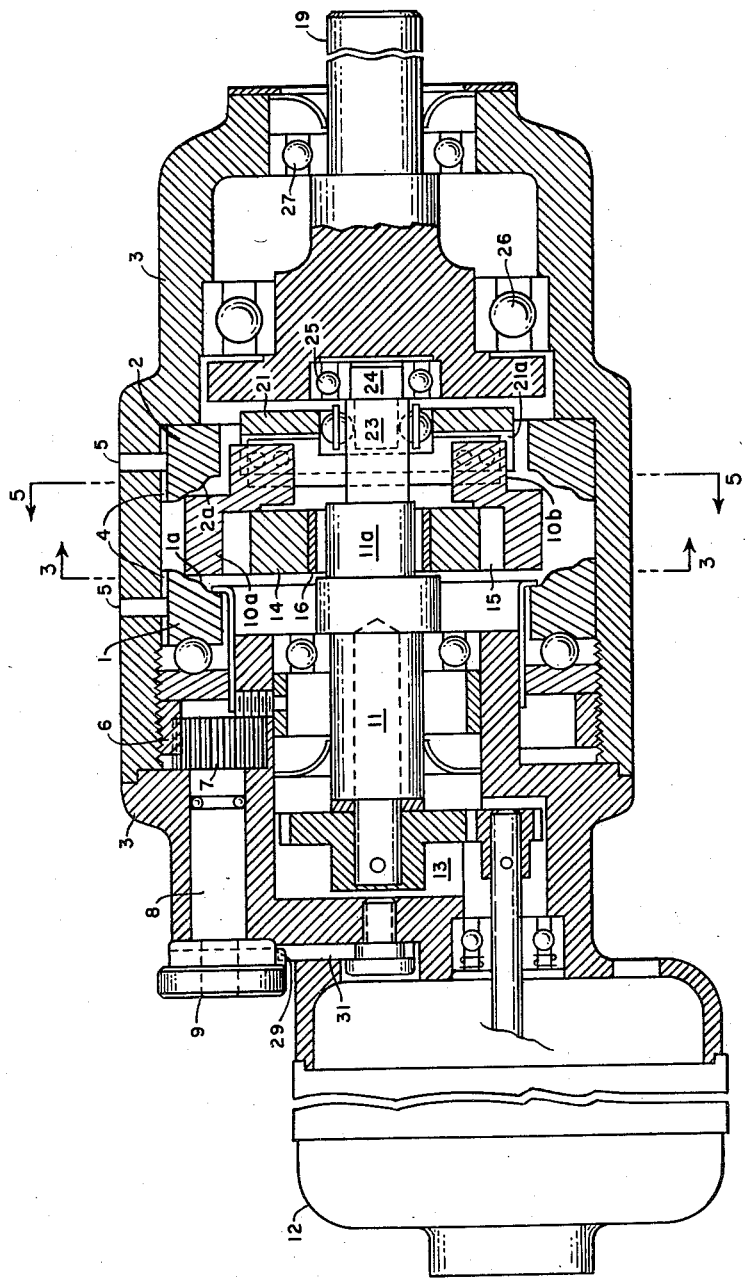
Fig. 2 is a cross sectional view of a detailed form of the device of Fig. 1.
Figure 5:
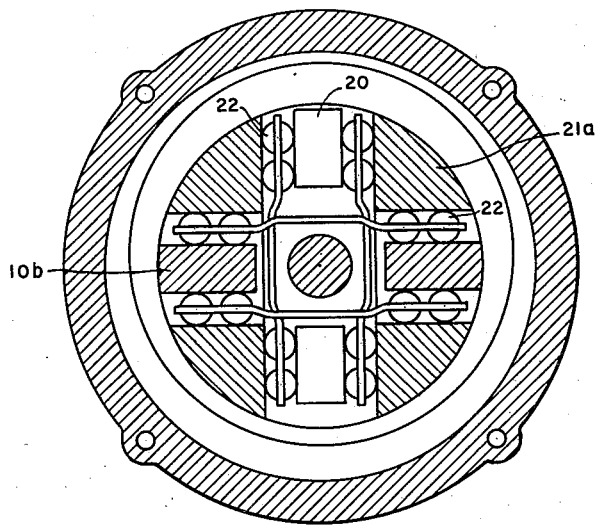
Fig. 5 is a sectional view taken along the line 5—5 of Fig. 2.

Means is provided for moving ring 1 axially of the cylindrical housing 3. The arrangement shown in Fig. 2 comprises a toothed rack 6 on the inner circumference of casing 3 arranged to be engaged by gear 7 carried on the end of shaft 8 which terminates in knob 9 on the outside of casing 3.

Intermediate rings 1 and 2 there is located a planet ring or member 10 having a cylindrical portion 10a disposed between rings 1 and 2. Planet portion 10a is free to roll on rings 1 and 2 and is made of such a diameter that it has one contact point on each ring. Adjacent surfaces of rings 1 and 2 have specially formed surfaces 1a and 2a, respectively, as is discussed later in this description. At this point it is merely noted that surfaces 1a and 2a are generally inclined so that as ring 1 is adjusted toward or away from ring 2, the contact points are moved closer or further from the center axis of the device, effectively changing the pitch circle of the rings and consequently changing the rotational speed of the planet.

Means is provided for driving the planet member 10. The embodiment illustrated in the drawings comprises a suitable driving or input shaft 11, which may be driven directly by a source of power such as electric motor 12 or indirectly through speed changing gear assembly 13.

Planet member 10 is mounted for rotation on a planet carrier 14 which in turn is carried by eccentric portion 11a of shaft 11. Suitable roller bearings 15 are interposed between carrier 14 and planet 10.

Figure 1:
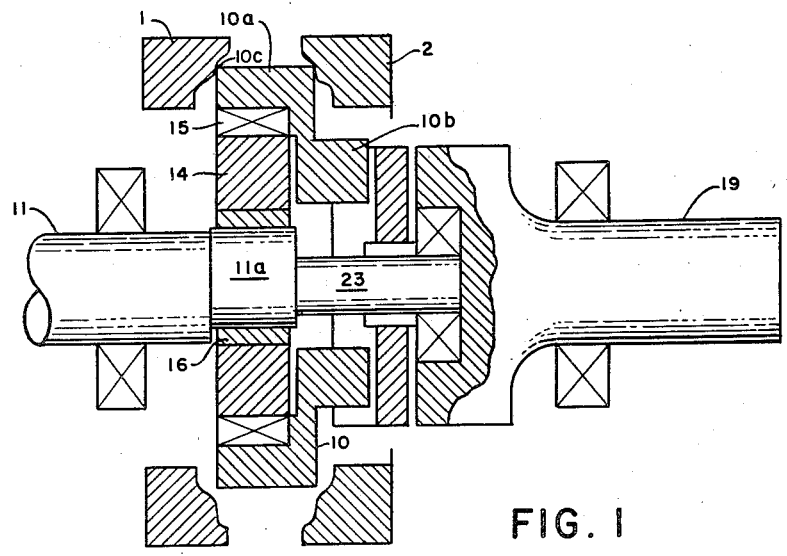

Referring to Fig. 1 in particular, it is seen that the outside diameter of ring 10 is sufficiently less than the diameters of rings 1 and 2 so that only a rolling point contact 10c of planet 10 with rings 1 and 2 is obtained, as noted above. In order to cause these contact points to move around the contact surfaces 1a and 2a in a circular path indicated by dotted circle 10c', planet carrier 14 is eccentrically mounted on eccentric shaft portion 11a. The eccentric position of the carrier is obtained by driving the carrier through a sliding block 16 having an opening 16a in which is journaled the fixed eccentric portion 11a of the drive shaft 11.

The window or opening 17 in carrier 14, in which sliding block 16 is gibbed, is off-center with respect to the axis of shaft 11 by the amount of eccentricity of the eccentric 11a so that planet member 10 can approach a concentric position relative to the axes of rings 1 and 2 as well as input shaft 11.

Means is provided for translating rotation of planet member 10 into rotation of output or driven shaft 19 which is illustrated as being suitably mounted coaxially with shaft 11. For this purpose planet member 10 is provided with a pair of diametrically spaced lugs 10b and shaft 19 is provided at its inner end with diametrically oposed lugs 20. Intermediate portions 10b and lugs 20 there is interposed member 21 having lugs or flanges 21a. Between lugs 10b and 21a and between lugs 20 and 21a there are disposed sets 22 of caged balls.

Shaft 19 may be mounted on seat portion 24 of extension 23 of shaft 11, with suitable ball bearing assemblies 25, 26, and 27 providing non-frictional supports.

From the foregoing description it is seen that rotation of input shaft 11 tends to cause rotation of planet 14 in the same direction by reason of the frictional contact between eccentric 11a and block 16. However, the frictional engagement between surfaces 1a and 2a and planet portion 10a transmitted through rollers 15 restrains such rotation and, in fact, causes planet 10 actually to rotate in the reverse direction.

Figure 6:
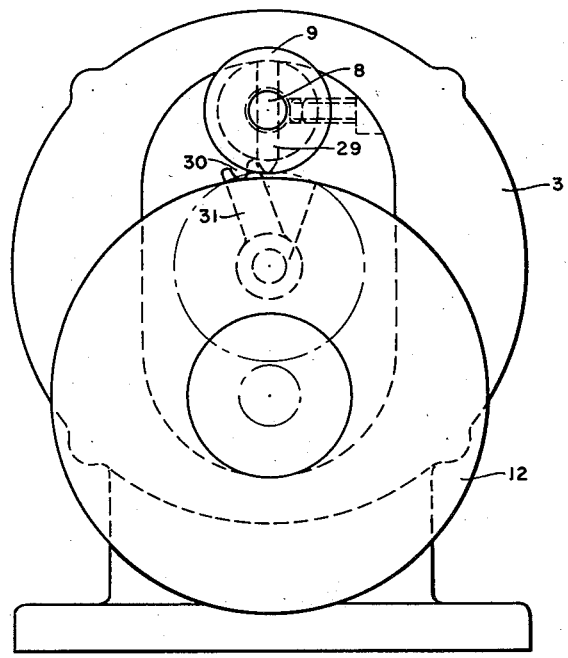
Fig. 6 is an end view of the device of Fig. 2 illustrating the speed ratio adjusting means of Fig. 2.

In Fig. 6, there is shown means for limiting the adjustment of gear 7 to two revolutions of knob 9. The inner face of knob 9 may carry a projection or member 29 which, assuming clockwise rotation of knob 9 as viewed in Fig. 6, engages recess 30 on the first revolution and carries arm 31 beyond the vertical so that on the second revolution of knob 9, member 29 engages arm 31 as a stop.

Figure 4:
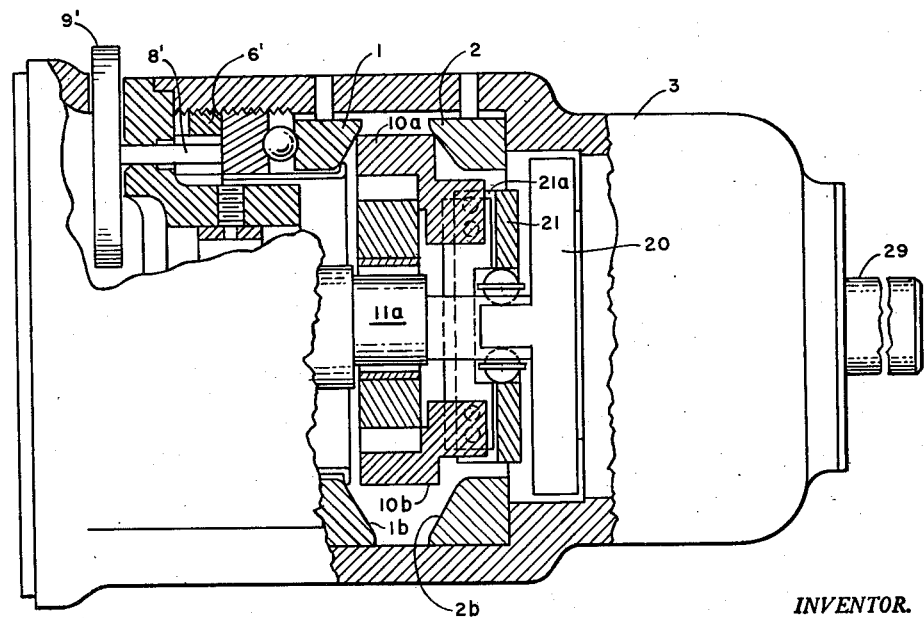
Fig. 4 is a top view, partly in section of a modified form of the invention.

Fig. 4 discloses an embodiment in which a direct motor drive is employed, and a slightly different adjustment utilizing knob 9 is used. Further description of the modifications is believed unnecessary.

Since traction type speed changers of the type shown herein are essentially constant-power devices, $$P = N_o T_o$$

where P=available power, $N_o$=output speed, and $T_o$=output torque. Also it is know that $$N_o = N_i \frac{R_r - R_p}{R_p}$$

where $N_i$= input speed, $R_r$=radius of ring and $R_p$=radius of planet. Combining these two equations gives $$T_o = \frac{P R_p}{N_i (R_r - R_p)}$$

Power P, input speed $N_i$ and planet radius $R_p$ can all be considered as constants, or $PR_p/N_i = k$. Term $R_r - R_p$ is recognized as the distance between the planet axis and the principal axis at any given time. The output torque therefore would vary as the inverse or $R_r - R_p$.

Figure 7:
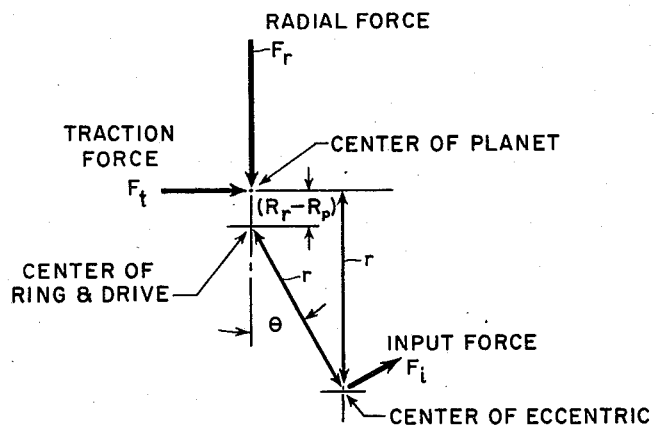
Fig. 7 is a diagram useful in understanding the principles of my invention.

In the force diagram of Fig. 7, the eccentric has moved relative to the carrier, through an angle $\theta$. Such movement has displaced the carrier vertically in the figure by distance $R_r - R_p$. It is obvious that $$R_r - R_p = r - r \cos \theta$$

Therefore, the following relationship should hold:

$$T_o = k \frac{1}{R_r - R_p} = k \frac{1}{r - r \cos \theta}$$

Resolving moments about the main axis gives $$F_i r = F_t (r - r \cos \theta)$$

or $$F_t = \frac{F_i r}{r - r \cos \theta}$$

Therefore traction force $F_t$ is proportional to $1/(r - r \cos \theta)$ and, of course, $F_t$ is proportional also to output torque $T_o$. Accordingly, the foregoing proportionality, $T_o = k/(r - r \cos \theta)$, holds.

Resolving moments about the center of the eccentric gives $$F_t = F_r r \sin \theta$$

or $$\frac{F_t}{F_r} = \sin \theta$$

Ideally the ratio of traction force $F_t$ to contact force $F_c$ should equal a factor, designated $\mu$, for safe operation. That is, $$\frac{F_t}{F_c} = \mu$$

and $$F_t = \mu F_c$$

Substituting this equation in the foregoing moment equation gives $$\mu \frac{F_c}{F_r} = \sin \theta$$

and $$F_c = \frac{F_r \sin \theta}{\mu}$$

Since $F_c$ is perpendicular to the contact surface, the angle of this surface from the radial should be the angle whose sine is $\mu/\sin \theta$. Therefore the form of the adjacent surfaces of the rings can be determined. It may be interesting at this point to comment on what would result if these surfaces were made, for example, conical or with constant angles of inclination. At some one point they could have just the right slope. As the contact points moved further out radially, insufficient contact forces would cause complete slip, or as $\theta$ approached 180 degrees, or zero, the contact forces could become excessive. For this reason, while ring 1 is movable or adjustable with respect to ring 2, means is provided for limiting the amount of separation of rings 1 and 2 to safe operation, as for example, by limiting the maximum adjustment or separation to cause the point of engagement of member and the rings to lie inwardly from the outer edge of the rings.

The foregoing analysis shows that the described mechanism can be designed, theoretically, to have the exact ideal requirements for constant-horsepower operation. Output torque can be made available in the exact amount required by the ratio of the input and output speeds, disregarding losses. Also, the contact surface wedge angles can be designed, by proper slope at the contact points corresponding to all output speeds, to produce just the value of contact force required for safe operation from the amount of radial force available. For example, if it is assumed that $\theta$=90 degrees, sin $\theta$=1 and the sine of the contact surface angle should equal $\mu$ at that point.

Reducing these findings to a practical design means in this case that the end of the range where $\theta$ approaches 0 must be modified inasmuch as the ring form goes to 90 degrees and then becomes indeterminate; the forces become very high and the adjustment difficult. It is necessary therefore to limit the maximum reduction so that output speeds do not go closer to zero than can be safely handled.

The design is reversible and is particularly applicable for reductions for about 15-to-1 to about 350-to-1 and for a power range to about ½ H. P.

While I have shown and described a particular embodiment of my invention, it will be obvious to those skilled in the art that changes and modifications may be made without departing from my invention in its broader aspects. For example, the adjacent ring surfaces 1a and 2a need not be formed in the undulating manner of Figs. 1 and 2 but any desired surface configuration may be used so long as the foregoing principles are kept in mind. In Fig. 4, straight inclined surfaces 1b and 2b are provided, these surfaces being rounded at the ends. With the arrangement of Fig. 4, correct action is safely obtained over the middle portion of the surfaces. I, therefore, aim in the appended claims to cover all such changes and modifications as fall within the true spirit and scope of my invention.

What I claim is:

1. In a speed changer, a driving shaft, said shaft having an eccentric portion, a planet carrier, means utilizing said eccentric portion for imparting eccentric movement to said carrier, a pair of spaced rings, adjacent surfaces of said rings being generally inclined with respect to the radii of said rings, and a planet member interposed between said carrier and said rings and engaging said rings, said rings and said planet member being circular, said planet member being of less diameter than said rings, said planet member being mounted within said rings, and said planet member being shaped substantially to provide point contact with said inclined surfaces.

2. The speed changer of claim 1 in which said planet carrier has an opening therein, and said means is interposed in said opening between said eccentric and said carrier for imparting said movement to said carrier.

3. In a speed changer, a driving shaft, said shaft having an eccentric portion, a planet carrier, said carrier having an opening therein, a block mounted for movement in said opening, said block having an opening therein, said eccentric extending into the opening in said block whereby said block is mounted eccentrically with respect to said driving shaft, a pair of axially spaced rings fixed against rotation and coaxially mounted with respect to said driving shaft, adjacent surfaces of said rings being generally inclined with respect to the radii of said rings, and a planet member interposed in engaging relationship between said planet carrier and said rings, said member and said rings being circular and said member being of less diameter than said rings, said planet member is mounted within said rings, and said planet member is shaped to provide substantially point contact with said inclined surfaces.

4. The speed changer of claim 1 in which said surfaces are formed so that the angle at each point of said surfaces from the radial is the angle whose sine is $\mu/\sin \theta$ where $\mu$ is a predetermined value of the ratio of traction force to contact force representing safe operation and $\theta$ is the angle through which the eccentric moves relative to the carrier.

5. The speed changer of claim 3 in which said surfaces are formed so that the angle at each point of said surfaces from the radial is the angle whose sine is $\mu/\sin \theta$ where $\mu$ is a predetermined value of the ratio of traction force to contact force representing safe operation and $\theta$ is the angle through which the eccentric moves relative to the carrier.

6. The speed changer of claim 1 together with means for moving one ring with respect to the other for effecting speed control, and means for limiting the amount of separation of said rings.

7. The speed changer of claim 3 together with means for moving one ring with respect to the other for effecting speed control, and means for limiting the amount of separation of said rings.

8. In a speed changer, a driving shaft, said shaft having an eccentric portion, a planet carrier, means utilizing said eccentric portion for imparting eccentric movement to said carrier, a pair of spaced rings, adjacent surfaces of said rings being generally inclined with respect to the radii of said rings, and a planet member interposed between said carrier and said surfaces, said planet member being shaped and positioned to engage said surfaces in a rolling point contact.

9. The speed changer of claim 3 in which the eccentric portion is circular in cross-section, the planet carrier opening is rectangular, the block is shaped for sliding movement within said carrier opening, and the block opening is circular and of larger diameter than the eccentric portion.

References Cited in the file of this patent
UNITED STATES PATENTS

| | | |
|---|---|---|
| 2,035,582 | Winger | Mar. 31, 1936 |
| 2,209,497 | Winger et al. | July 30, 1940 |
| 2,656,737 | Lang | Oct. 27, 1953 |